US009501056B2

(12) United States Patent
Hutson

(10) Patent No.: US 9,501,056 B2
(45) Date of Patent: Nov. 22, 2016

(54) AUTONOMOUS ROBOT FOR A MOBILE DEVICE

(71) Applicant: QUALCOMM Incorporated, San Diego, CA (US)

(72) Inventor: Donald Bolden Hutson, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/448,940

(22) Filed: Jul. 31, 2014

(65) Prior Publication Data

US 2015/0142252 A1 May 21, 2015

Related U.S. Application Data

(60) Provisional application No. 61/906,852, filed on Nov. 20, 2013.

(51) Int. Cl.
*G05D 1/02* (2006.01)
*G05D 1/00* (2006.01)
*B25J 5/00* (2006.01)

(52) U.S. Cl.
CPC .............. *G05D 1/0038* (2013.01); *B25J 5/00* (2013.01); *G05D 2201/0214* (2013.01); *Y10S 901/01* (2013.01); *Y10S 901/47* (2013.01)

(58) Field of Classification Search
CPC ...... G05D 1/0231; B25J 5/00; Y10S 901/01; Y10S 901/47
USPC .......................................................... 701/28
See application file for complete search history.

(56) References Cited

U.S. PATENT DOCUMENTS

| 4,386,848 | A | * | 6/1983 | Clendenin | F41G 3/165 244/3.13 |
|---|---|---|---|---|---|
| 7,182,025 | B2 | * | 2/2007 | Ghorbel | F16L 55/26 104/139 |
| 8,588,972 | B2 | | 11/2013 | Fung | |
| 2011/0288684 | A1 | | 11/2011 | Farlow et al. | |
| 2012/0264414 | A1 | | 10/2012 | Fung | |
| 2012/0290111 | A1 | | 11/2012 | Badavne et al. | |
| 2013/0019019 | A1 | | 1/2013 | Lam | |

(Continued)

FOREIGN PATENT DOCUMENTS

| DE | 202012104592 U1 * | 12/2012 | .............. H04M 1/04 |
|---|---|---|---|
| DE | WO 2014083024 A2 * | 6/2014 | .............. H04M 1/04 |

(Continued)

OTHER PUBLICATIONS

Meet Romo, Your Robot Friend, Retrieved on Jan. 28, 2014, Retrieved from the Internet <URL: http://romoyive.com/meet-romo >, 6 pages.

(Continued)

*Primary Examiner* — Behrang Badii
*Assistant Examiner* — Michael Berns
(74) *Attorney, Agent, or Firm* — Seyfarth Shaw LLP

(57) ABSTRACT

A robotic device includes a housing configured to house a mobile device. The robotic device also includes an articulating image director aligned with a field of view of a camera of the mobile device. The housing of the robotic device is positioned at an angle to provide a forward view or rear facing view to the camera via the articulating image director.

19 Claims, 7 Drawing Sheets

(56) References Cited

U.S. PATENT DOCUMENTS

2014/0121835 A1* 5/2014 Smith .................. B25J 5/005
    700/259
2014/0297067 A1  10/2014 Malay

FOREIGN PATENT DOCUMENTS

| JP | 2012056001 A   | 3/2012  |
| KR | 20110123630 A  | 11/2011 |
| KR | 20120129230 A  | 11/2012 |
| KR | 101247150 B1   | 4/2013  |
| WO | 2012091804 A2  | 7/2012  |
| WO | 2013183861 A1  | 12/2013 |
| WO | 2014120307 A2  | 8/2014  |

OTHER PUBLICATIONS

International Search Report and Written Opinion—PCT/US2014/064126—ISA/EPO—Mar. 26, 2015.

* cited by examiner

AUTONOMOUS ROBOT FOR A MOBILE DEVICE

CROSS REFERENCE TO RELATED APPLICATION

This application claims the benefit under 35 U.S.C. §119(e) to U.S. Provisional Patent Application No. 61/906,852, entitled "AUTONOMOUS ROBOT FOR A MOBILE DEVICE," filed on Nov. 20, 2013, the disclosure of which is expressly incorporated herein by reference in its entirety.

BACKGROUND

1. Field

Certain aspects of the present disclosure generally relate to robots, and more particularly, to systems and methods for controlling a robot based on a forward facing image captured via a camera defined within a mobile device.

2. Background

Robots, such as autonomous robots, may include a housing for a mobile device. The mobile device may be coupled to the robot and may be used as a processor for controlling the robot. Additionally, in some cases, the forward camera and/or rear camera of the mobile device may be used as an image capturing device and/or an image sensor for the robot. In a conventional robot, the mobile device is coupled to the robot in an upright position. The upright position may be undesirable because the high center of gravity may cause the robot to become unstable. Additionally, the mobile device may be prone to damage because of the upright position. Therefore, it is desirable to provide a robot that is capable of housing a mobile device in a safer position with a low center of gravity.

SUMMARY

According to an aspect of the present disclosure, a robotic device is disclosed. The robotic device includes a housing configured to house a mobile device. The robotic device also includes an articulating image director aligned with a field of view of a camera of the mobile device.

Another aspect of the present disclosure discloses a method of controlling a robotic device. The method includes viewing a forward direction via a camera of a mobile device coupled to the robotic device. The method also includes controlling the robotic device based on objects captured via the camera and/or movements captured via the camera.

Yet another aspect of the present disclosure discloses an apparatus. The apparatus includes means for viewing a forward direction via a camera of a mobile device coupled to the robotic device. The apparatus also includes means for controlling the robotic device based on objects captured via the camera and/or movements captured via the camera.

Another aspect discloses an apparatus having a memory and one or more processors coupled to the memory. The processor(s) is configured to view a forward direction via a camera of a mobile device coupled to the robotic device. The processor(s) is further configured to control the robotic device based on objects captured via the camera and/or movements captured via the camera.

In another aspect, a computer program product for controlling a robotic device is disclosed. The computer program product includes a non-transitory computer readable medium. The computer readable medium has non-transitory program code recorded thereon, which, when executed by the processor(s), causes the processor(s) to perform operations of viewing a forward direction via a camera of a mobile device coupled to the robotic device. The program code also causes the processor(s) to control the robotic device based on objects captured via the camera and/or movements captured via the camera.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
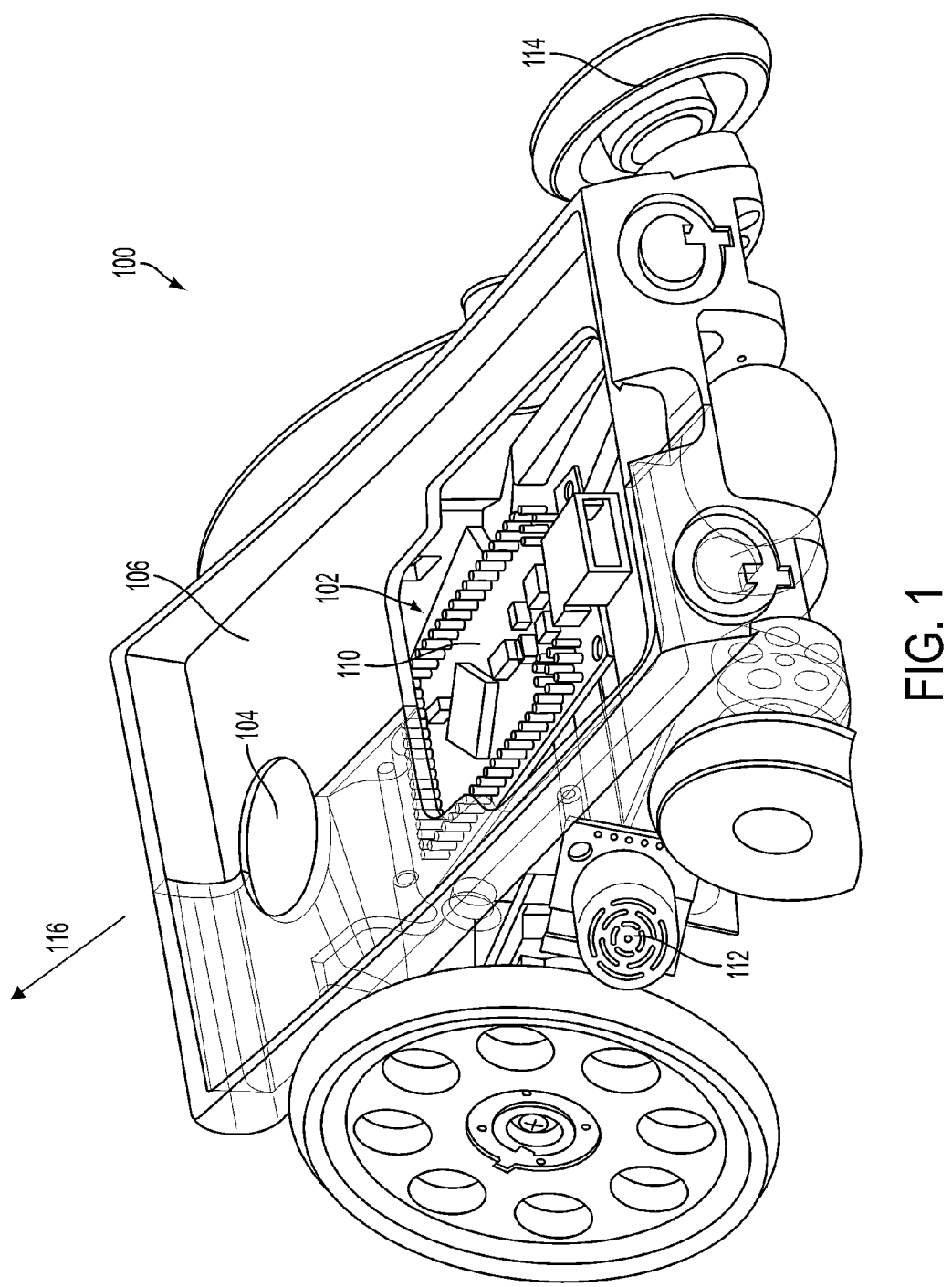
FIGS. 1-6 illustrate different views of a robotic device according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Aspects of the present disclosure are directed to a robot with a housing for a mobile device. The housing may be positioned so that the mobile device may be placed in a flat or angled position. In one configuration, the housing is positioned at a specific angle, such as a fifteen degree angle. In one configuration, magnets secure a cell phone. Additionally, or alternatively, the mobile device may be encased by the robot to reduce or prevent damage to the mobile device.

As previously discussed, the housing may be positioned so that the mobile device may be placed in a flat or angled position. The flat or angled position allows the user to operate the touch screen of the mobile device while the robot is on the ground. That is, the robot does not have to be moved to use the functionality, such as the camera and/or touch screen, of the mobile device.

Furthermore, an articulating image director (e.g., mirror) may be coupled to the housing and aligned with a field of view of a camera of the mobile device. That is, the mobile device may be positioned in the housing with the screen facing up and the rear facing camera aligned with the articulating image director. The rear facing camera refers to the camera of the mobile device that is defined on the surface of the mobile device that is opposite to the screen. The camera may be configured to capture still images or video.

Furthermore, de-rotation software may be specified to compensate for rotation due to mirror panning. Specifically, the de-rotation software may use sensory information as to the state of the mirror. Moreover, the de-rotation software may set a parameter to rotate an image so that the horizon of the image is level for improved image processing. Furthermore, images may be pan-stitched to create a panoramic image from multiple views of the one or more cameras. The de-rotation software may be desirable to a human operator.

In one configuration the robot is controlled via a remote control that provides a forward facing view to the user. The user may control the robot to move in any direction with the remote control. Still, without the de-rotation, the direction viewed by the user may be an opposite direction. That is, the image may be flipped or reversed due to mirror panning. Thus, the de-rotation software is specified to improve the remote controlling of the robot by the user.

In one configuration, the robot is specified as a carrying case for the mobile device. Additionally, or alternatively, aspects of the present disclosure may be incorporated in the body of the mobile device. The mobile device is not limited to a cell phone, aspects of the present disclosure are also contemplated for other devices such as tablet computers, laptops, laptop-tablet hybrids, and/or other devices that include cameras.

As an example, the mobile device may be placed in a dashboard cradle of a vehicle to provide a forward facing view of a roadway and also passengers. In the present example, the image director may pan, tilt, and/or roll to provide a forward facing view while the car is at an angle, such as when the car is turning. The forward facing view provides the driver with an expanded field of view. Additionally, or alternatively, the image director may pan, tilt, and/or roll to any desired angle in relation to the position of the car to provide an expanded field of view. Moreover, the mobile device may facilitate multimodal integration of audio and visual in car applications for noise reduction and/or improved voice recognition capability.

In one configuration, the housing is configured in such a manner so that the camera is aligned with the articulating image director. For example, one or more camera openings may be defined within the housing to receive a camera of the mobile device. The camera openings allow the camera to be aligned with the articulating image director. As another example, the housing may not cover a portion of the mobile device so that the camera is aligned with the articulating image director.

In one configuration, the articulating image director may be a mirror, tube, light pipe, fiber optic cable, or other device that allows an image to be directed to the camera. The articulating image director may be referred to as the image director. The image director may be set at a specific angle to provide a forward facing view to the downward facing camera. That is, when a camera of a mobile device is aligned with the image director, the camera may provide a forward facing view from the robot. The mobile device may be coupled to the robot via a hardwire connection, such as USB, or a wireless connection, such as BLUETOOTH™. Thus, the mobile device may communicate with the sensors and motors of the robot via the wired and/or wireless connection.

Additionally, a sound director may also be specified on the robot. The sound director may direct audio output from one or more speakers of the mobile device. Specifically, the sound director is aligned with the speaker of the mobile device so that the audio may be directed to a desired location. The sound director may be a tube or other structure that directs audio waves.

As discussed above, the image director is configured to articulate. Based on an angle and size of the image director, the forward facing view may be a ceiling to floor view. One or more servos or motors may be coupled to the image director to provide articulation. That is, the servos or motors may tilt, roll, and/or pan the image director. Additionally, or alternatively, the camera of the mobile device may be configured to pan, adjust its angle, or zoom in and out. Furthermore, in one configuration, the angle/direction of the image director may be adjusted via wireless communication, such as BLUETOOTH™. Additionally, the image director may have a concave or convex shape to provide different views to the camera. Moreover, the image director may be swappable so that different types of image directors may be aligned with the camera as desired.

As an example, the image director may facilitate a teleconference. That is, the robot may be placed on a desk or other surface during a teleconference. The robot may be stationary or may move to participants so that an image of a participant during the teleconference is captured via the image director. Moreover, a face recognition algorithm may be specified in the mobile device to detect the faces of participants in the teleconference.

The captured images may provide improved searching algorithms for the robot. Furthermore, the low profile of the robot provides for an improved interaction with obstacles in the robot's environment. That is, the mobile device provides on board vision for the robot to avoid obstacles and map the robot's environment. One or more sensors may be provided on the robot for improved environmental sensing. The modular motor and wheel arrangement may provide for various wheel configurations, such as four wheel, three wheel, tread drive, and/or mid-wheel configurations.

In one configuration, a ranging device, such as a laser, may provide depth information. That is, the ranging device may be defined on the mobile device or on the frame of the robot so that the light of the ranging device reflects off of the image director. The camera may determine depth information based on the offset from the intersection of the camera axis. As an example, a laser is defined adjacent to the camera to reflect light off the image director. In another configuration, depth information may be calculated based on stereo imaging. The depth information may be used by applications of the mobile device. In another configuration, the image director may reflect light from a flashlight or LED to illuminate the forward facing direction.

Furthermore, wheels may be defined on the housing to provide locomotion to the robot. In one configuration, the wheels may be differential drive wheels. Still, aspects of the present disclosure are not limited to wheels and other devices may provide locomotion. For example, legs, vibration movement, treads, and/or omnidirectional wheels may provide locomotion. Furthermore, the wheels may be angled to prevent jamming against surfaces and/or scuffing of surfaces.

FIG. 1 illustrates a robot 100 according to an aspect of the present disclosure. As shown in FIG. 1, the robot 100 includes a housing 106 with a first opening 104. In one configuration, the robot 100 may also include a second opening 102. Aspects of the present disclosure are also contemplated for a robot with only one opening (e.g., first opening 104) or multiple openings. The first opening 104 is positioned so that a rear facing camera of a mobile device is aligned with the first opening 104.

As shown in FIG. 1, the robot 100 may also include a circuit board 110. The circuit board 110 may be a printed circuit board (PCB) or other type of board that is configured to house electrical components for the robot 100. The robot 100 may also include one or more sensors 112 and one or more wheels 114. As previously discussed, the wheels 114 are not limited to the wheels illustrated in FIG. 1 and may be any type of arrangement that provides mobility to the robot 100, such as, four wheel configurations, three wheel configurations, and/or treads. The sensors 112 cover the perimeter of the robot 100. By placing the mobile device in a more compact, horizontal orientation, fewer sensors are specified to cover the perimeter in comparison to conventional upright robots having a larger surface area.

In one configuration, an image director is positioned below the first opening 104 (not shown in FIG. 1). The image director provides a forward view of the robot 100 to the camera of the mobile device. The forward view refers to the field in the direction of arrow 116 of FIG. 1. The view available to the robot 100 is not limited to a specific area. That is, because of the position of the image director, the robot 100 may have a floor to ceiling view. Moreover, a servo may be coupled to the image director so that the image director may also pan left and pan right, roll, and/or tilt. Thus, the field of view can be adjusted without moving the robot 100 itself.

Figure 2:
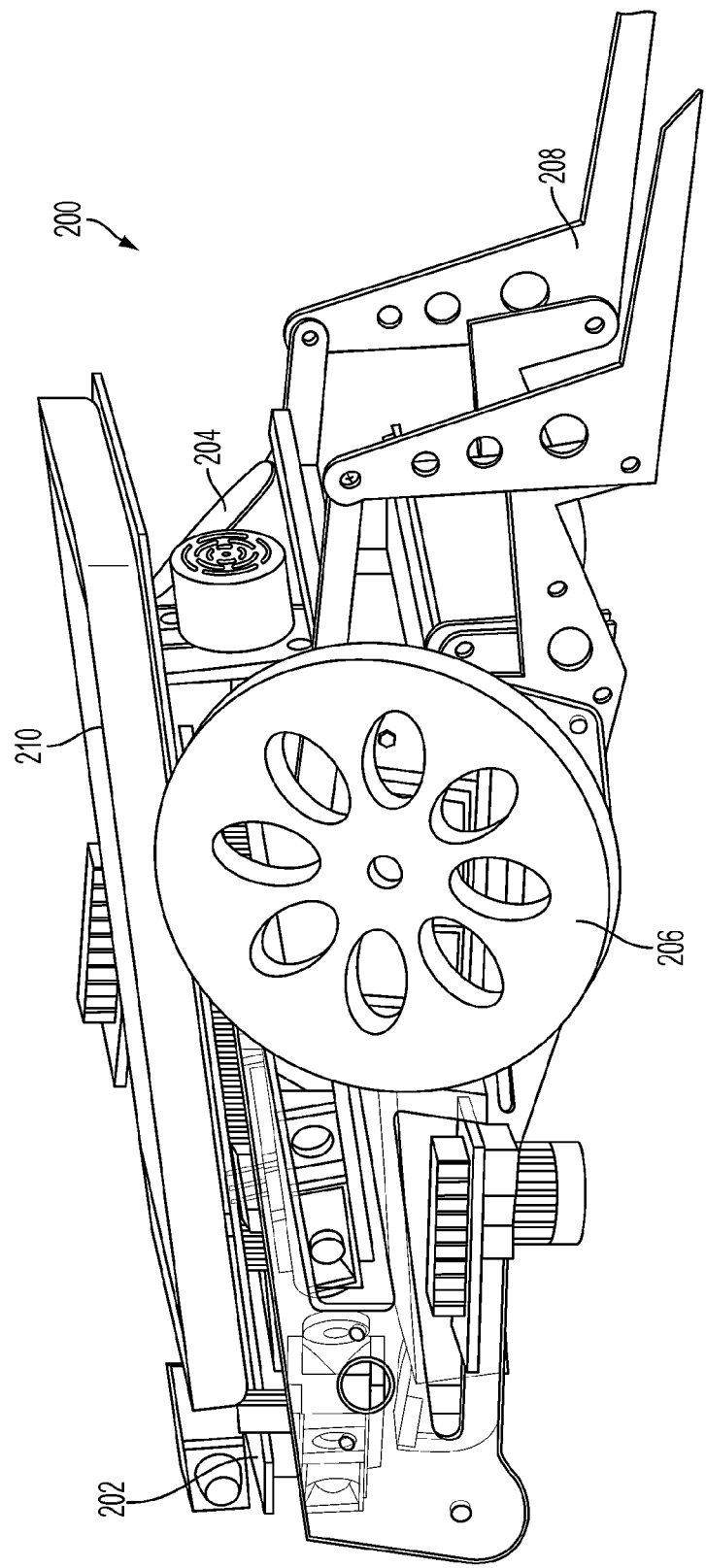

FIG. 2 is a side view of a robot 200 according to an aspect of the present disclosure. As shown in FIG. 2, the robot 200 includes a housing 202, an image director 204, a wheel 206, and a forklift 208. The image director 204 is positioned to be aligned with a camera (not shown) of a mobile device 210.

That is, the mobile device 210 is placed in the housing 202 and positioned so the camera of the mobile device 210 is positioned over an opening (not shown) of the housing 202. The image director 204 is positioned at an angle to allow a specific view, such as a ceiling to floor view of the forward field of the robot 200. Thus, by being placed below the opening of the housing 202, the image director 204 provides the camera of the mobile device 210 with a forward facing view. A servo or motor (not shown) may be specified to articulate the image director 204. Specifically, the servo or motor may pan, tilt, and/or roll the image director 204. The image director 204 may be a mirror or other surface to provide a forward facing view and/or an expanded view to the rear facing camera of the mobile device.

In one configuration, a forklift 208 may be coupled to the robot 200 to perform tasks such as lifting. The image director 204 provides the robot 200 with a forward facing view while the forklift 208 is in a flat position, such as the position shown in FIG. 2, or when the forklift 208 is in an elevated position. In another configuration, the robot 200 may be coupled to another object for performing tasks, such as a hook, claw, and/or hockey stick. In one example, based on the view acquired with the camera, the robot 200 may control the hockey stick to sweep back and forth to contact an object, such as a hockey puck.

As shown in FIGS. 1 and 2, the housing and/or frame of the robot are not limited to a specific materials or forms. Aspects of the present disclosure contemplate any material and form for the housing and/or frame of the robot. In one configuration, as shown in FIG. 2, the circuit boards of the robot 200 are used as the frame and may also be used as the housing 202. Furthermore, the housing 202 may be adjustable to accommodate various form factors (e.g., sizes) of mobile devices 210.

Moreover, aspects of the present disclosure are not limited to the rear facing camera being place over the opening of the housing. Aspects are also contemplated for a forward facing camera to be placed over the opening of the housing so that the forward facing camera may have an expanded view via the image director. Furthermore, in one configuration, a second image director may be defined over the forward facing camera of the mobile device so that the robot may process two images (e.g., stereo imaging). That is, the robot may receive a forward facing image via a first image director aligned with the rear facing camera of the mobile device. Additionally, the robot may receive a rear facing image via a second image director aligned with the forward facing camera of the mobile device. Of course, the second image director is not limited to only a rear view and aspects of the present disclosure contemplate the second image director to provide other views to the robot. The second image director could also be configured to permit other robots to see the screen of the mobile device.

The robot may be powered by a battery source coupled to the frame of the robot. The battery source may include a rechargeable battery, such as a lithium-ion battery, or a disposable battery, such as AAA or AA batteries. The robot may also be configured to charge the mobile device. The mobile device may be charged via a hardwired connection and/or inductive charging.

For example, an interface board on the robot may provide trickle charging to the robot and/or the mobile device. Furthermore, the forward facing view via the image director may locate a docking station to charge the mobile device and/or robot when the battery is below a threshold. The docking station may be an inductive charger. The contacts for the inductive charging may be defined on a frame and/or wheels of the robot.

As previously discussed, the mobile device may communicate with the sensors and motors of the robot via the wired and/or wireless connection. Additionally, the robot may communicate with a user and/or another device that is not coupled to the robot via a wired and/or wireless connection. For example, a user may control the robot with a wired or wireless remote control. The remote control may be another mobile device with software for controlling the robot. The wired connection may be a connection such as USB. The wireless connection may be a connection such as BLUETOOTH™ or WiFi.

In one configuration, the robot is not mobile. For example, the robot may be placed on a bookshelf. The wheels of the robot may be removable to facilitate placement on various surfaces, such as the bookshelf. The image director would still enable the mobile device to see different views while remaining stationary. The image director attached to the camera may include a pan, tilt, and/or roll mechanism via one or more servos/motors. The image director may include its own power source or may be powered via the robot's power supply.

Figure 3:
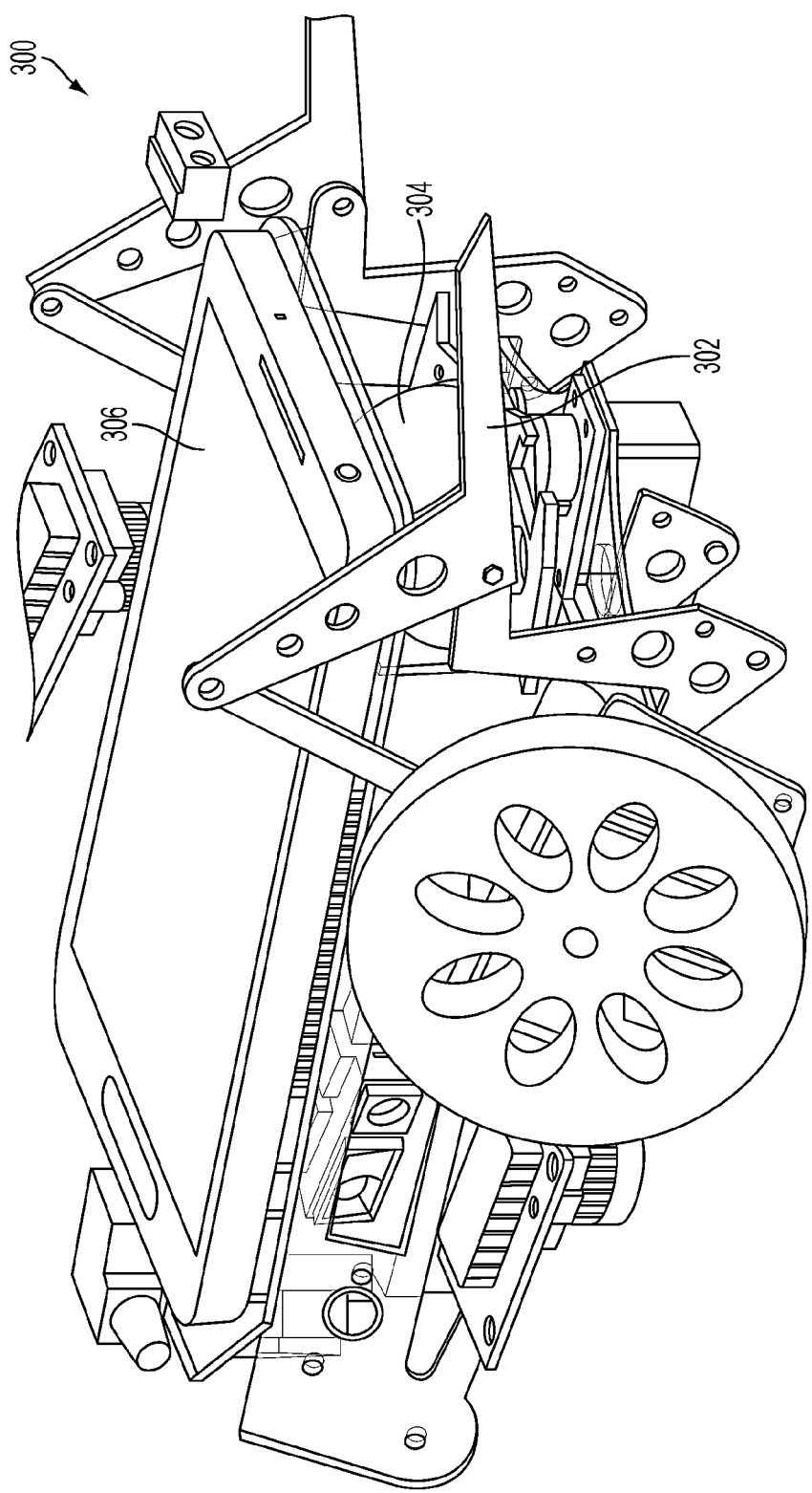

FIG. 3 illustrates a side angle view of a robot 300 according to an aspect of the present disclosure. As shown in FIG. 3, the forklift 302 may be elevated without blocking the field of view of the rear facing camera or image director 304. That is, in the present configuration, the robot 300 may have a forward view from a camera, such as the rear facing camera, of the mobile device 306 and the image director 304 while the forklift 302 is elevated.

Figure 4:
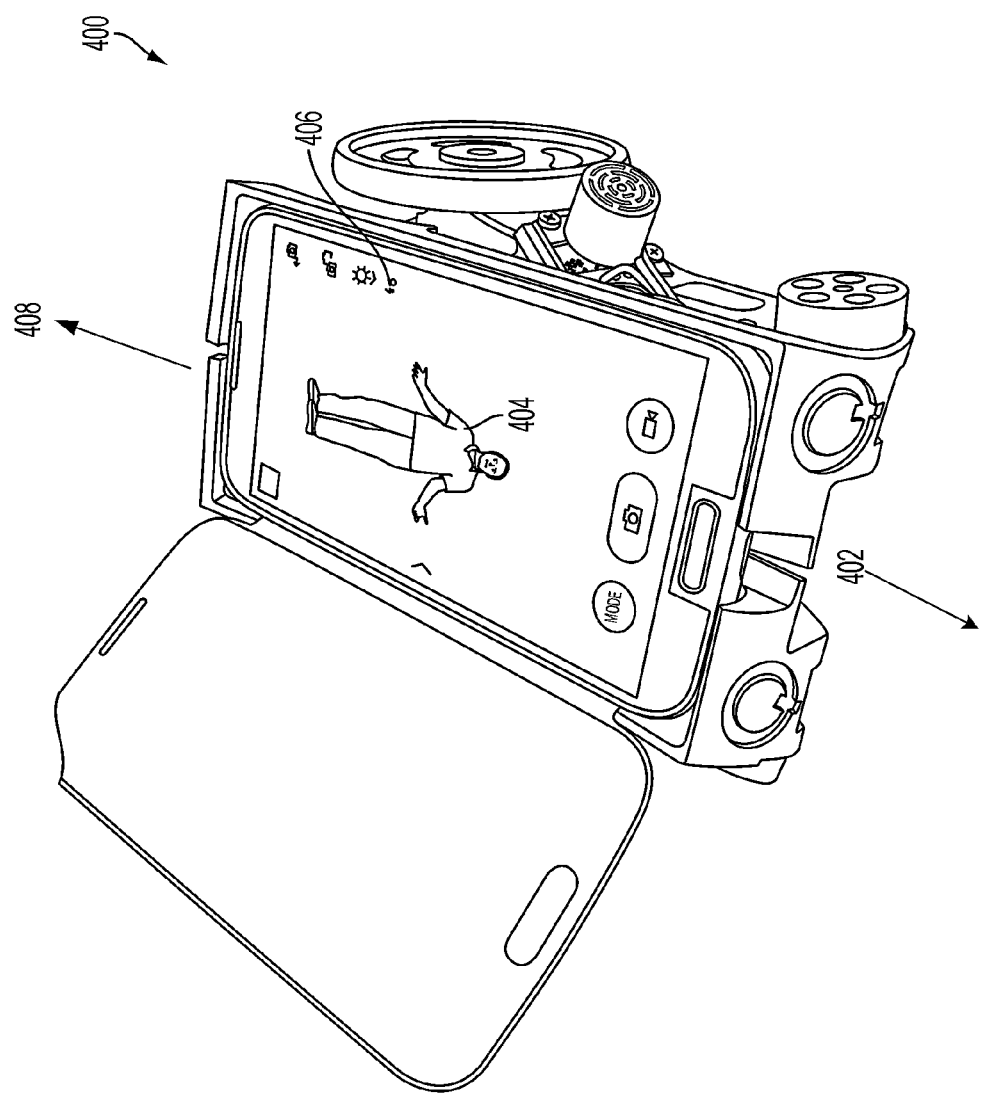

FIG. 4 illustrates a view of a robot 400 according to an aspect of the present disclosure. As shown in FIG. 4, an object 404, such as a person, that is located in the forward direction 408 of the robot 400 may be visible on the display of the mobile device 406. The object 404 is visible via the rear facing camera (not shown) of the mobile device 406 and the image director (not shown) of the robot 400 that is aligned with the rear facing camera. In one configuration, gestures of the object 404, such as moving a hand, which are captured by the camera may control the robot's movements for a forward direction 408, a reverse direction 402, or any direction that is orthogonal to the forward 408 and/or reverse 402 directions.

Figure 5:
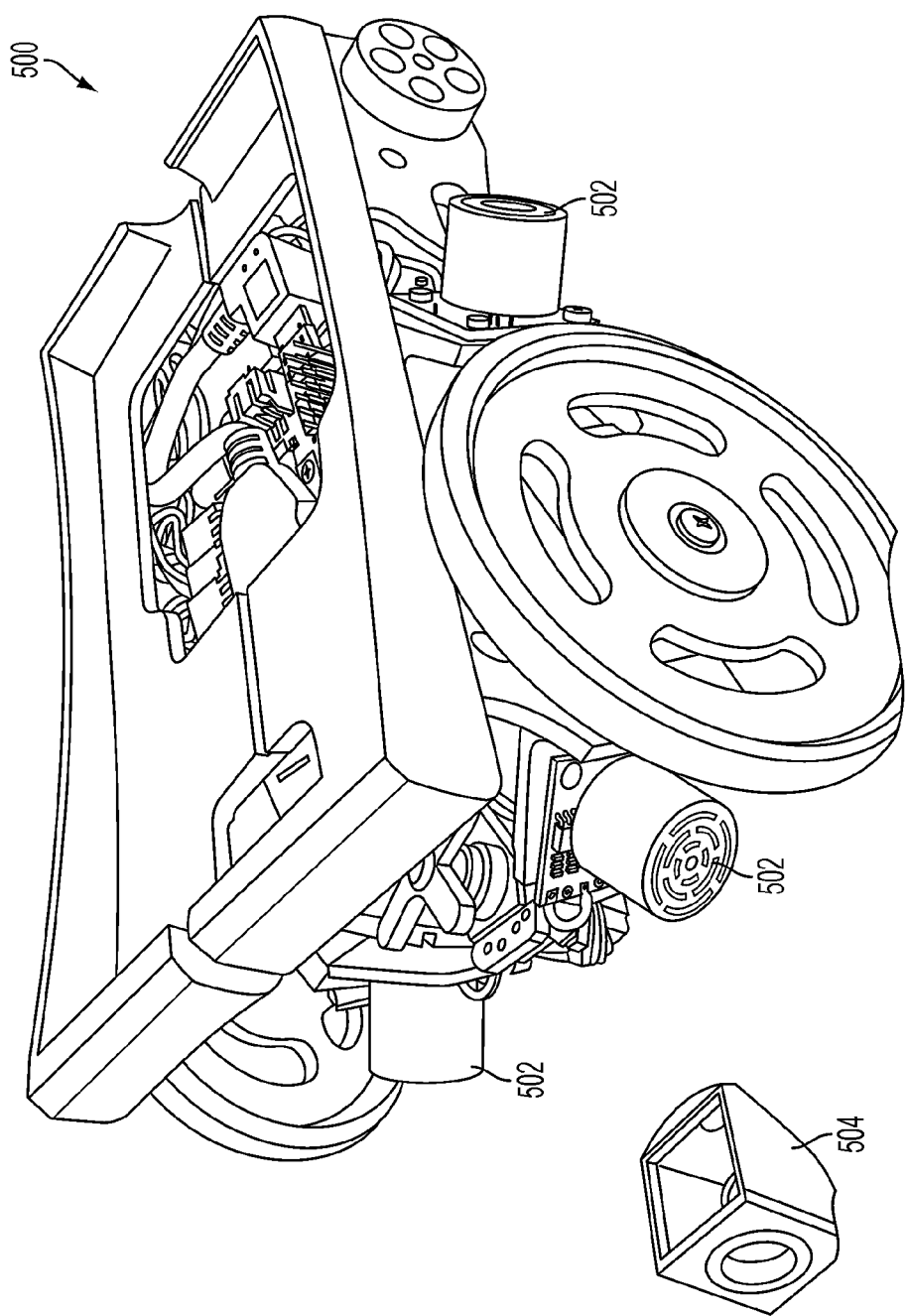

FIG. 5 illustrates a view of a robot 500 according to an aspect of the present disclosure. As shown in FIG. 5, various sensors 502 may be defined on or coupled to the frame of the robot 500. The sensors 502 along with the camera of the mobile device allow the robot to sense objects in the robot's environment. Furthermore, FIG. 5 illustrates a detached image director 504. As previously discussed, the image director 504 may be attachable so that different types of image directors, such as a mirror or light pipe, may be attached is desired.

Figure 6:
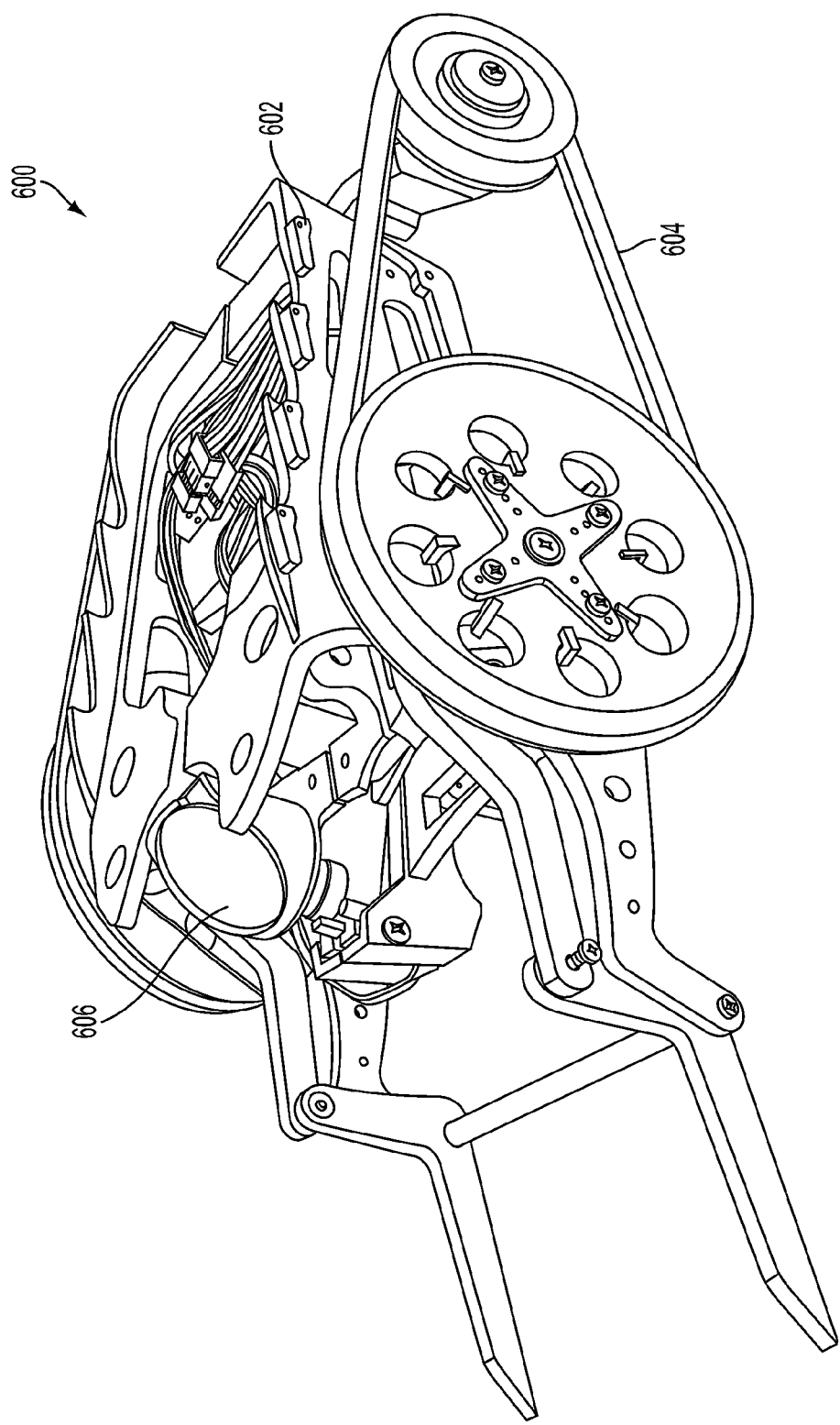

FIG. 6 illustrates a view of a robot 600 according to an aspect of the present disclosure. As shown in FIG. 6, the housing 602 of the robot 600 may not be fully enclosed near the front of the robot 600 to allow for the camera of the mobile device to be aligned with the image director 606. Furthermore, as shown in FIG. 6, treads 604 may be placed between the wheels of the robot.

Figure 7:
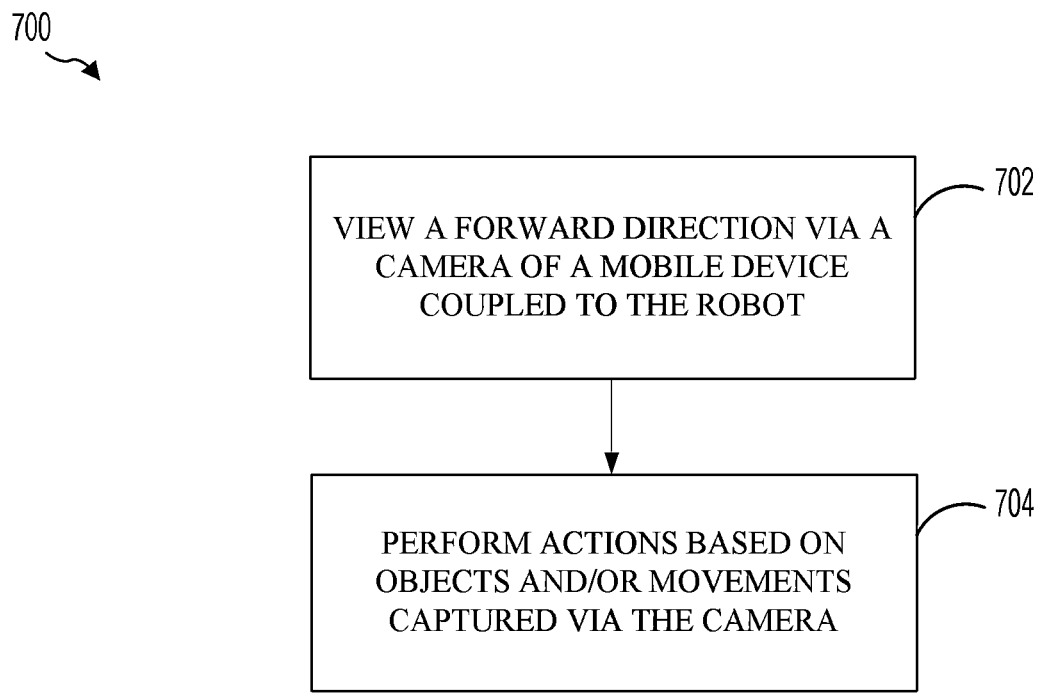
FIG. 7 is a flow chart illustrating a method for autonomously controlling a robot in accordance with an aspect of the present disclosure.

FIG. 7 illustrates a flow chart 700 for autonomously controlling a robot in accordance with aspects of the present disclosure. As shown in block 702, the robot views a forward direction via a camera of a mobile device coupled to the robot. The camera captures moving or still images via an image director aligned with the camera. As shown in block 704, the robot performs actions based on objects and/or movements captured via the camera.

In one configuration, a robot, such as the robot 100, is configured for autonomous operation including means for housing. In one aspect, the housing means may be the housing. The robot is also configured to include a means for viewing. In one aspect, the performing means may be the image director. In another aspect, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of a list of" items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A robotic device, the robotic device comprising:
   a housing configured to house a mobile device;
   an articulating image director, aligned with a field of view of a first camera of the mobile device, to provide a view of a forward direction of the robotic device to the first camera, the mobile device comprising de-rotation software to rotate an image captured by the first camera so that a horizon of the image is level when viewed by an external operator; and
   at least one of a plurality of wheels, a plurality of treads, or a combination thereof, configured to move the robotic device based on a gesture occurring substantially behind the robotic device and viewed by a second camera of the mobile device, the second camera facing a direction opposite of a direction faced by the first camera.

2. The robotic device of claim 1, in which the plurality of wheels comprise angled wheels, and the plurality of treads comprise angled treads.

3. The robotic device of claim 1, further comprising at least one motor to control a movement of the articulating image director.

4. The robotic device of claim 3, further comprising at least one sensor to control the movement of the articulating image director.

5. The robotic device of claim 3, in which the movement of the articulating image director comprises at least one of rolling, tilting, palming, or a combination thereof.

6. The robotic device of claim 1, in which the articulating image director is a mirror or a light pipe.

7. The robotic device of claim 6, in which the mirror is convex or concave.

8. The robotic device of claim 1, in which the articulating image director is further aligned with a light source of the mobile device.

9. The robotic device of claim 1, in which the plurality of wheels comprise a first set of wheels and a second set of wheels, a diameter of the first set of wheels being greater than a diameter of the second set of wheels.

10. A method of controlling a robotic device, the method comprising:
    coupling a mobile device to the robotic device;
    viewing a forward direction of the robotic device via a first camera of the mobile device aligned with an articulating image director of the robotic device to provide the forward view to the first camera;
    rotating an image captured by the first camera so that a horizon of the image is level when viewed by an external operator; and
    controlling the robotic device based on a gesture occurring substantially behind the robotic device and viewed by a second camera, the second camera facing a direction opposite of a direction faced by the first camera.

11. The method of claim 10, further comprising controlling movement of the articulating image director.

12. The method of claim 11, in which the movement of the articulating image director comprises at least one of rolling, tilting, panning, or a combination thereof.

13. A non-transitory computer-readable medium having non-transitory program code recorded thereon for controlling a robotic device, the program code comprising:
    program code to view a forward direction of the robotic device via a first camera of a mobile device coupled to the robotic device, the view of the forward direction provided via an articulating image director of the robotic device aligned with a field of view of the first camera to provide the forward view to the first camera;
    program code to rotate an image captured by the first camera so that a horizon of the image is level when viewed by an external operator; and
    program code to control the robotic device based on a gesture occurring substantially behind the robotic device and viewed by a second camera, the second camera facing a direction opposite of a direction faced by the first camera.

14. The non-transitory computer-readable medium of claim 13, in which the program code further comprises program code to control movement of the articulating image director.

15. The non-transitory computer-readable medium of claim 14, in which the movement of the articulating image director comprises at least rolling, tilting, panning, or a combination thereof.

16. An apparatus comprising:
    means for housing a mobile device, the means for housing being positioned at an angle relative to a surface below the mobile device;
    means for image directing, aligned with a field of view of a first camera of the mobile device to provide a view of a forward direction of the apparatus to the first camera, the mobile device comprising de-rotation software to rotate an image captured via the first camera so that a horizon of the image is level when viewed by an external operator; and
    means for providing locomotion to the apparatus based on a gesture occurring substantially behind the apparatus and viewed by a second camera, the second camera facing a direction opposite of a direction faced by the first camera.

17. The apparatus of claim 16, further comprising means for controlling a movement of the image directing means.

18. The apparatus of claim 17, further comprising means for sensing to further control the movement of the image directing means.

19. The apparatus of claim 18, in which the movement of the image directing means comprises at least one of rolling, tilting, panning, or a combination thereof.

* * * * *